3,189,301
FLOTATION DEVICE FOR HELICOPTER
Arthur Parkes, Yeovil, England, assignor to Westland Aircraft Limited, Yeovil, England
Filed Feb. 20, 1964, Ser. No. 346,324
Claims priority, application Great Britain, Mar. 8, 1963, 9,199/63
3 Claims. (Cl. 244—17.17)

This invention relates to flotation devices for helicopters and is more particularly applied as a device for ensuring flotation of aircraft of this type after ditching.

Hitherto it has been customary to provide flotation devices for helicopters of the inflatable bag type which may be automatically inflated by immersion switch means or manually selected switch means, or of the fixed float type which are a permanent feature of the alighting gear of the aircraft, or permanent air bags or tanks disposed elsewhere about the structure of the machine. These forms of flotation devices have numerous disadvantages, the principal one being that the devices are all arranged so that the helicopter, when in the water, shall remain in a normal attitude or as near thereto as is possible, which is a condition in which the centre of gravity of the aircraft is relatively high in relation to the surface of the water. Obviously, therefore, one prime requirement during the ditching procedure is that the pilot shall endeavor to set his machine on the water in this attitude in order that the symmetry of the flotation devices may provide their maximum effectiveness and stability. It will thus be seen that it becomes a difficult and hazardous operation on all types of water surface conditions, for besides the possibility of inflatable bags on both sides of the aircraft failing to fill simultaneously, waves can strike the machine and both these circumstances impart a rolling motion thereto which, due to the relatively high position of the centre of gravity, tends to cause it to turnturtle.

Accordingly we have evolved our invention with the aforementioned disadvantages in mind and have provided apparatus which utilises the inherent tendencies of a helicopter when ditching, thereby obviating the aforementioned difficulties.

The invention consists in flotation apparatus for a helicopter comprising one or more flotation members secured to the helicopter in a manner such as to cause same to maintain a floating position with the normal vertical plane of the helicopter substantially parallel to the surface of the water.

Figure 1:
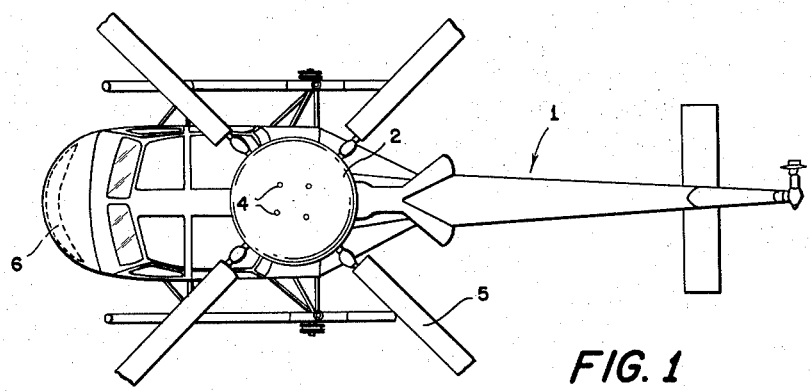
Figure 2:
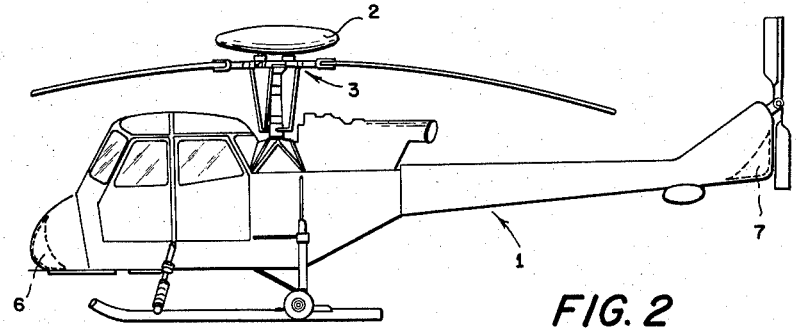
Figure 3:
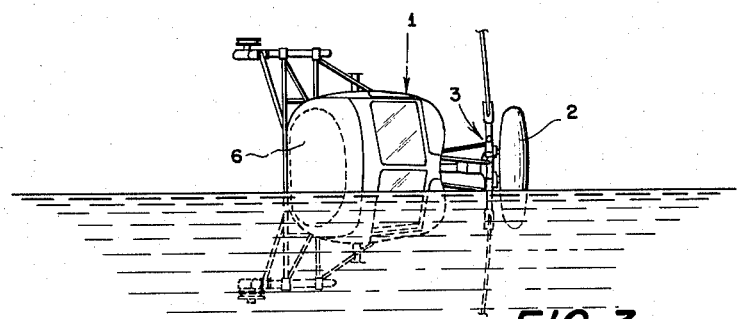

Further objects and advantages of the invention will become more readily apparent from the following description of a preferred embodiment, with reference to the accompanying drawings wherein:

FIGURE 1 is a plan view of a helicopter with the flotation members.
FIGURE 2 is a side elevation of FIGURE 1.
FIGURE 3 is a headon view of ditched helicopter.

The description and drawings are by way of example only and do not infer limitation of the invention thereto.

We provide a helicopter 1 with a 100% excess buoyancy member 2 (being defined as a member providing a total buoyancy equalling twice the quantity required to hold the helicopter with its normally vertical centre plane in the plane of the water surface (FIGURE 3)) in the form of an oblate sphere mounted centrally and laterally on the top-side of the rotor head 3 in a manner such as to produce minimum extra parasitic drag to the aircraft. The buoyancy member 2 is constructed of glass fibre reinforced plastic and is filled with a low density rigid polyurethane foam and is secured to the rotor head 3 at four simple attachment points 4 by lugs and bolts (not shown) which are wire locked as is the usual practice. The diameter of the buoyancy member 2 is such that it is within the normal radial distance from the rotor hub at which the blades 5 are prone to fracture upon inpact on an obstruction, thereby providing a high dagree of safeguard from damage of the member 2 during ditching. Supplementary flotation members 6 and 7 are mounted in the helicopter about its longitudinal centre line in a manner such that they are disposed in the nose and within the tail structure at a sensibly extreme aft position, respectively.

It is a coincidental advantage that in some cases such a member as the aforementioned oblate sphere provides a reduction of tail vibration to thereby permit a slight increase of speed. The member serves to smooth the air flow passing around the rotor head, thereby reducing the air turbulence behind the head. This serves to reduce the buffetting of the tail structure, thereby enabling the machine to be flown at a slightly higher speed than would otherwise be safe.

The ditching procedure and operation of the apparatus will now be described. Prior to descent onto the water all windows and doors are to be closed, the helicopter 1 then set down, which is an operation now requiring considerably less exactitude than hitherto due to it being a prime object of the invention that the helicopter shall be permitted to roll onto either of its sides, to be there checked by the 100% excess buoyancy flotation member 2. The helicopter 1 will remain floating substantially in this position for at least some considerable period of time, due, at first, to the boat-like condition provided by the limited water tightness of its body and the stabilising effect of the principal flotation member 2, then settling gradually as the water enters the body until the supplementary flotation members 6 and 7 become effective to check the rate of sink and provide pitch stabilisation, thereby preventing the nose or tail plunging. Thus it will be seen that once the aircraft has attained a position on the water where it is lying on its side it is then possible for the occupants to open doors, windows and hatches along the upper side to make their escape; this being facilitated in that the machine has attained the most stable position possible in the circumstances and that escape apertures are provided above the occupants which is a more naturally acceptable position, when in undulating motion, than apertures to the side through which one must crawl.

It will be readily apparent to those skilled in the art that the invention herein disclosed may be applied equally well to helicopters having more than one rotor and that further the principal buoyancy member may be situated anywhere high up on the centre line of the machine and not necessarily adjacent the rotor(s), although this is to be preferred. Likewise supplementary flotation members may be disposed in a manner such as to be effective on the longitudinal centre line of the aircraft either forward or aft or both forward and aft of the centre of gravity. It will be also obvious that if the flotation members, being preformed, are not acceptable then inflatable members may be substituted these being normally disposed in fairings of reduced size. Obviously the principal buoyancy member may be constructed of materials other than glass fibre reinforced plastic, for example metal may be employed and fillers of low density other than rigid polyurethane foam may be used, or the member may be filled with air.

It will be appreciated that the supplementary flotation members are not a prime essential to the success of the application (although they are to be preferred) because in many instances the buoyancy capacity of the body of a helicopter will provide a reasonable period of time for a crew to escape before it fills with water and submerges.

I claim as my invention:

1. In combination, a helicopter having at least one main rotor with a normal vertical center plane of the helicopter extending vertically through the center of the helicopter in the normal position thereof, means for supporting the helicopter floating on the side thereof with the normal vertical plane substantially parallel to the surface of the water, said means including first flotation apparatus mounted above the center of gravity of the helicopter in the normal position of the helicopter, said first flotation apparatus being symmetrical about the vertical center plane.

2. The combination according to claim 1 wherein said means for supporting the helicopter floating on the side thereof further comprises second flotation apparatus disposed symmetrically about the vertical center plane and secured to the helicopter fuselage at at least one extremity thereof, said second flotation apparatus being located with respect to said first flotation apparatus as to assist in longitudinal stability.

3. The combination according to claim 1 wherein said first flotation apparatus comprises buoyancy means mounted adjacent the vertical axis of at least one main rotor and in the vertical center plane of the helicopter.

References Cited by the Examiner
UNITED STATES PATENTS 2,940,700  6/60  Trannoy _____ 244—107
3,102,705  9/63  Namsick _____ 244—105 X FERGUS S. MIDDLETON, *Primary Examiner.*

MILTON BUCHLER, *Examiner.*